United States Patent
Nguyen et al.

(10) Patent No.: US 9,047,907 B2
(45) Date of Patent: Jun. 2, 2015

(54) ELECTRONIC DEVICE AVOIDING FALSE DETECTION OF FREE FALL EVENT BASED ON DETECTED OPERATING MODES

(75) Inventors: Jonathan V. Nguyen, Laguna Niguel, CA (US); Toviah N. Hirschberg, Fremont, CA (US); Hien T. Chu, Fountain Valley, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 772 days.

(21) Appl. No.: 13/167,532

(22) Filed: Jun. 23, 2011

(65) Prior Publication Data

US 2012/0324980 A1 Dec. 27, 2012

(51) Int. Cl.
| | |
|---|---|
| *G01N 19/02* | (2006.01) |
| *G11B 19/04* | (2006.01) |
| *G01P 15/00* | (2006.01) |
| *G01P 15/08* | (2006.01) |
| *G06F 11/30* | (2006.01) |

(52) U.S. Cl.
CPC ............ *G11B 19/043* (2013.01); *G01P 15/00* (2013.01); *G01P 15/08* (2013.01); *G06F 11/3013* (2013.01); *G06F 11/3058* (2013.01); *G06F 11/3093* (2013.01); *G11B 19/042* (2013.01)

(58) Field of Classification Search
CPC ..... G01P 15/0891; G01P 1/127; G11B 19/04; G11B 21/12; G11B 25/043; G11B 2220/2516; G01H 1/00; G06F 12/0246; G06F 3/0659; G06F 11/108

USPC ............ 73/12.06, 514.16, 29.05, 30.04, 45.2, 73/54.38, 61.58, 65.06, 65.09, 648, 654, 73/658, 811, 114.61, 514.01
See application file for complete search history.

(56) References Cited

U.S. PATENT DOCUMENTS

| | | | |
|---|---|---|---|
| 5,546,806 A | * | 8/1996 | Kain ........................... 73/514.31 |
| 6,104,153 A | | 8/2000 | Codilian et al. |
| 6,549,359 B1 | | 4/2003 | Bennett et al. |
| 6,768,066 B2 | * | 7/2004 | Wehrenberg ............... 200/61.49 |
| 7,042,663 B2 | * | 5/2006 | Shimotono et al. ............ 360/31 |
| 7,059,182 B1 | * | 6/2006 | Ragner ........................... 73/200 |
| 7,071,597 B2 | * | 7/2006 | Lee et al. ...................... 310/329 |
| 7,161,758 B2 | | 1/2007 | Adapathya et al. |
| 7,191,089 B2 | * | 3/2007 | Clifford et al. ............... 702/141 |
| 7,281,522 B1 | * | 10/2007 | Sato et al. ...................... 123/492 |
| 7,307,228 B2 | | 12/2007 | Wehrenberg |
| 7,369,345 B1 | | 5/2008 | Li et al. |
| 7,382,576 B2 | | 6/2008 | Okada et al. |
| 7,397,626 B2 | | 7/2008 | Aoki et al. |
| 7,477,469 B2 | | 1/2009 | Cook et al. |
| 7,499,232 B2 | | 3/2009 | Hodge et al. |
| 7,525,750 B2 | | 4/2009 | Aoki et al. |
| 7,525,751 B2 | * | 4/2009 | Han et al. ......................... 360/75 |
| 7,541,551 B2 | | 6/2009 | Wehrenberg |
| 7,663,833 B2 | * | 2/2010 | Aoki et al. ....................... 360/75 |
| 7,667,743 B2 | | 2/2010 | Uchida et al. |
| 7,690,253 B2 | * | 4/2010 | Noda et al. ...................... 73/510 |

(Continued)

*Primary Examiner* — Peter Macchiarolo
*Assistant Examiner* — Mohammed Keramet-Amircola

(57) ABSTRACT

An electronic device is disclosed comprising an acceleration sensor operable to generate an acceleration signal, and a free fall detector operable to detect a free fall event in response to the acceleration signal. A frequency response of the acceleration signal is measured, and the free fall detector is disabled when a magnitude of the frequency response within one of a plurality of frequency bands exceeds a threshold, wherein each frequency band corresponds to one of a plurality of normal operating modes.

20 Claims, 5 Drawing Sheets

(56) References Cited

U.S. PATENT DOCUMENTS

| | | |
|---|---|---|
| 7,706,097 B2 | 4/2010 | Kuroki et al. |
| 7,747,818 B1 | 6/2010 | Overby |
| 7,751,142 B2 | 7/2010 | Karakas |
| 7,752,351 B1 | 7/2010 | Overby |
| 7,782,563 B2 * | 8/2010 | Han et al. .................. 360/75 |
| 7,802,476 B2 | 9/2010 | Lasalandra et al. |
| 7,865,253 B2 * | 1/2011 | Harrington .................. 700/21 |
| 8,245,573 B2 | 8/2012 | Lammel |
| 8,345,025 B2 | 1/2013 | Seibert et al. |
| 8,363,344 B2 | 1/2013 | Lin et al. |
| 8,408,041 B2 | 4/2013 | Ten Kate et al. |
| 2005/0213242 A1 | 9/2005 | Fujiki et al. |
| 2006/0070439 A1 * | 4/2006 | Kwon et al. .................. 73/488 |
| 2006/0152842 A1 * | 7/2006 | Pasolini et al. .................. 360/75 |
| 2007/0223123 A1 * | 9/2007 | Karakas .................. 360/31 |
| 2007/0253087 A1 * | 11/2007 | Lee .................. 360/69 |
| 2010/0290145 A1 * | 11/2010 | Ahmad et al. .................. 360/31 |
| 2011/0215940 A1 | 9/2011 | Bartholomeyczik et al. |
| 2012/0324980 A1 | 12/2012 | Nguyen et al. |
| 2013/0054180 A1 | 2/2013 | Barfield |
| 2013/0107394 A1 | 5/2013 | Lin et al. |
| 2013/0120147 A1 | 5/2013 | Narasimhan et al. |

* cited by examiner

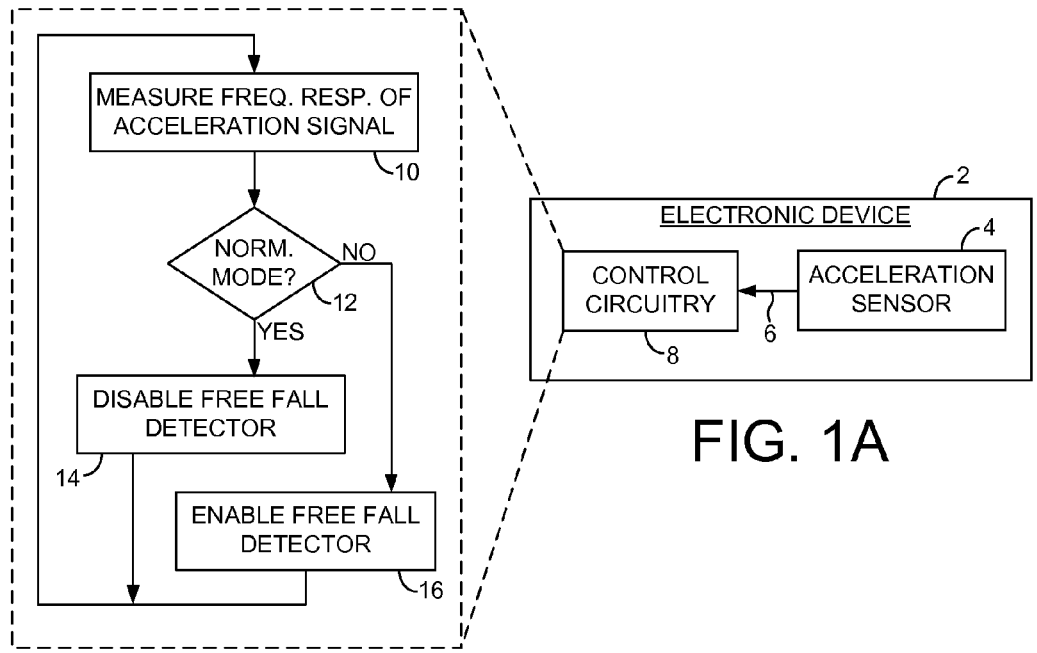
FIG. 1A
FIG. 1B
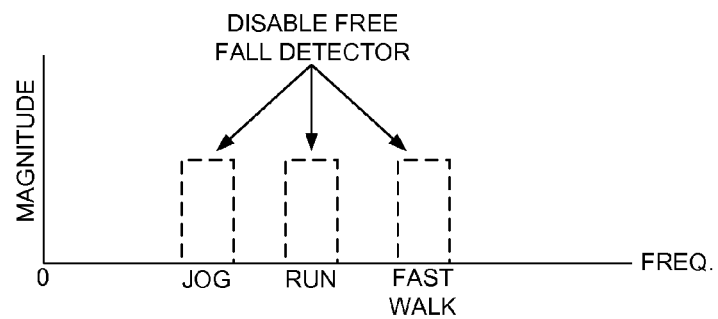
FIG. 1C

US 9,047,907 B2

ELECTRONIC DEVICE AVOIDING FALSE DETECTION OF FREE FALL EVENT BASED ON DETECTED OPERATING MODES

BACKGROUND

Electronic devices are ubiquitous in society, including portable electronic devices such as laptops, tablet computers, cell phones, smart phones, music players, game players, etc. An electronic device may include a free fall sensor typically implemented as an acceleration sensor. If a free fall event is detected (e.g., if a detected acceleration exceeds a threshold), the electronic device may take protective action to prevent damage to internal components before it hits the ground. For example, an electronic device may include a disk drive having a head actuated over a disk, wherein the electronic device may unload the head onto a ramp when a free fall event is detected.

BRIEF DESCRIPTION OF THE DRAWINGS

FIG. 1A shows an electronic device according to an embodiment of the present invention comprising an acceleration sensor for generating an acceleration signal, and control circuitry for detecting a free fall event in response to the acceleration signal.

FIG. 1B is a flow diagram according to an embodiment of the present invention wherein a frequency response of the acceleration signal is measured and the free fall detector disabled when the frequency response indicates a normal operating mode.

FIG. 1C illustrates different frequency bands corresponding to different normal operating modes, including a user jogging, running, and walking fast according to an embodiment of the present invention.

DETAILED DESCRIPTION OF EMBODIMENTS OF THE INVENTION

Figure 2:
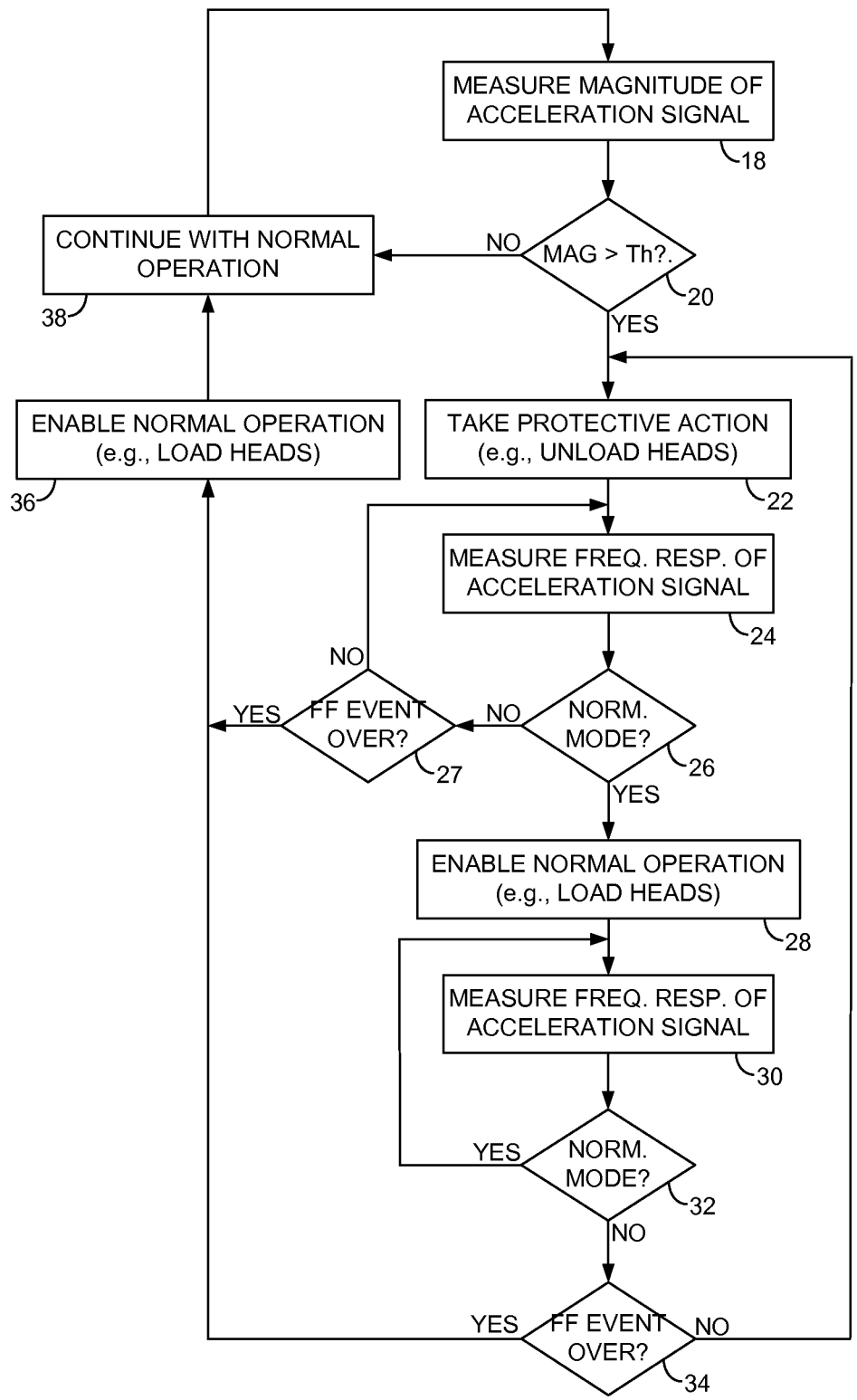
FIG. 2 is a flow diagram according to an embodiment of the present invention wherein the free fall detector is initially enabled and then disabled as the frequency response of the acceleration signal indicates a normal operating mode.

FIG. 1A shows an electronic device 2 according to an embodiment of the present invention comprising an acceleration sensor 4 operable to generate an acceleration signal 6, and control circuitry 8 comprising a free fall detector operable to detect a free fall event in response to the acceleration signal 6. The control circuitry 8 is operable to execute the flow diagram of FIG. 1B, wherein a frequency response of the acceleration signal is measured (step 10), and the free fall detector is disabled (step 14) when a magnitude of the frequency response within one of a plurality of frequency bands exceeds a threshold (step 12), wherein each frequency band corresponds to one of a plurality of normal operating modes. When the frequency response of the acceleration signal indicates an abnormal operating mode (step 12), the free fall detector is enabled (step 16) and protective action is taken when a free fall event is detected.

In one embodiment, the free fall detector detects a free fall event when a magnitude of the acceleration signal exceeds a threshold. For example, when a user drops the electronic device, the acceleration signal will exceed the threshold and therefore action is taken to protect the device. For example, if the electronic device 2 comprises a disk drive having a head actuated over a disk, the control circuitry 8 may unload the head onto a ramp when a free fall event is detected. However, taking protective action such as unloading the heads in a disk drive may reduce the performance of the electronic device when a false free fall event is detected. For example, if a user is jogging with an electronic device (e.g., a music player), false free fall events will be detected with each stride the user takes. The false free fall events may interrupt operation of the electronic device, or may disable the electronic device altogether. Accordingly, in the embodiments of the present invention the frequency response of the acceleration signal is evaluated to determine when false free fall events are being detected during a normal mode of operation (as opposed to actually dropping the electronic device). When the frequency response of the acceleration signal indicates a normal mode of operation, the free fall detector is disabled to avoid degrading performance of the electronic device.

FIG. 1C illustrates an embodiment of the present invention wherein a plurality of frequency bands are defined, where each frequency band corresponds to a normal operating mode. In the example of FIG. 1C, the normal operating modes correspond to a user moving, such as a user jogging, or running, or walking fast. However, the free fall detector may be disabled during any suitable operating mode, such as when a normal external vibration is affecting the electronic device that would otherwise trigger the detection of a false free fall event.

Each of the normal operating modes (e.g., jog, run, fast walk) will induce a corresponding signature in the frequency response of the acceleration signal. For example, when a user is jogging the frequency of the user's strides will manifest in the frequency response of the acceleration signal. Similarly, when a user is running the frequency of the user's strides will change and manifest around a different frequency in the frequency response. Accordingly, when the magnitude of the frequency response within one of the defined frequency bands exceeds a threshold, a normal operating mode is detected and the free fall detector is disabled. Otherwise the free fall detector is enabled and a free fall event detected when the magnitude of the acceleration signal exceeds a threshold.

FIG. 2 is a flow diagram according to an embodiment of the present invention wherein while the electronic device is powered on, the control circuitry measures the magnitude of the acceleration signal (step 18). When the magnitude of the acceleration signal exceeds a threshold (step 20), a free fall event is detected and protective action is taken (step 22). The frequency response of the acceleration signal is measured (step 24) and evaluated to determine whether the electronic device is operating in a normal mode (step 26). The frequency response of the acceleration signal is continually evaluated until the free fall event is over (step 27). For example, a free fall event may be considered over when the magnitude of the acceleration signal remains below a threshold for a predetermined interval.

When a normal operating mode is detected while detecting free fall events (step 26), the free fall detector is disabled so as to enable normal operation of the electronic device, such as by loading a head over a disk of a disk drive (step 28). After enabling normal operation of the electronic device, the control circuitry continues evaluating the frequency response of the acceleration signal (step 30). When the frequency response indicates the electronic device is no longer in a normal operating mode (step 32), and the free fall event is still being detected relative to the magnitude of the acceleration signal (step 34), then the flow diagram is repeated starting at step 22. If the free fall event is over (at step 28 or step 34), then the electronic device is enabled for normal operation (step 36). While a free fall event is not being detected (step 20), the electronic device continues operating in a normal mode (step 38).

Figure 3A:
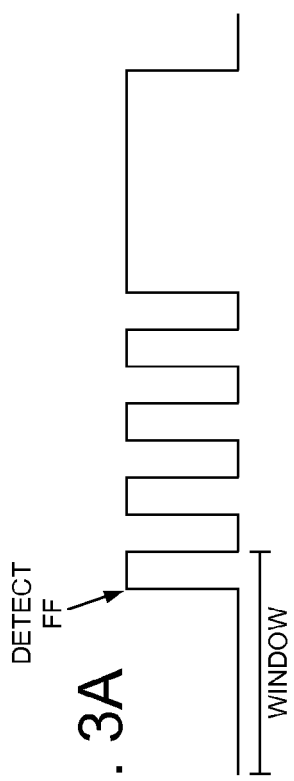
FIGS. 3A and 3B illustrate an embodiment of the present invention wherein a free fall event is detected initially as a user begins jogging.
Figure 3B:
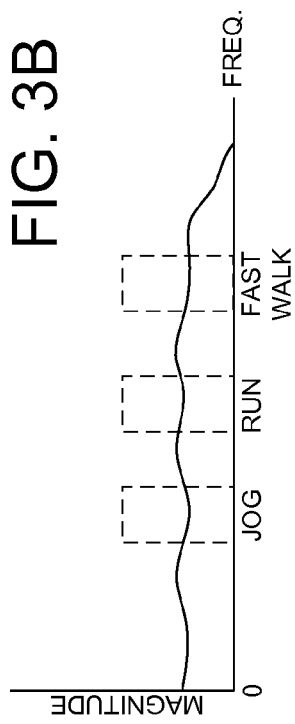
Figure 3C:
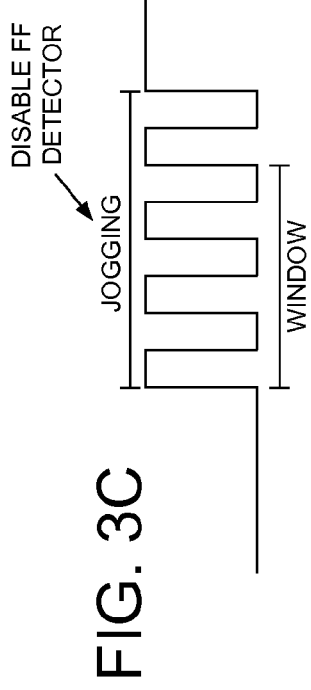
FIGS. 3C and 3D illustrate an embodiment of the present invention wherein the free fall detector is disabled when a magnitude of the frequency response within one of a plurality of frequency bands exceeds a threshold.
Figure 3D:
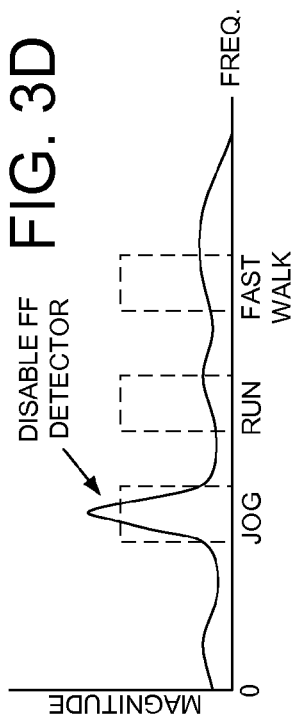
Figure 3E:
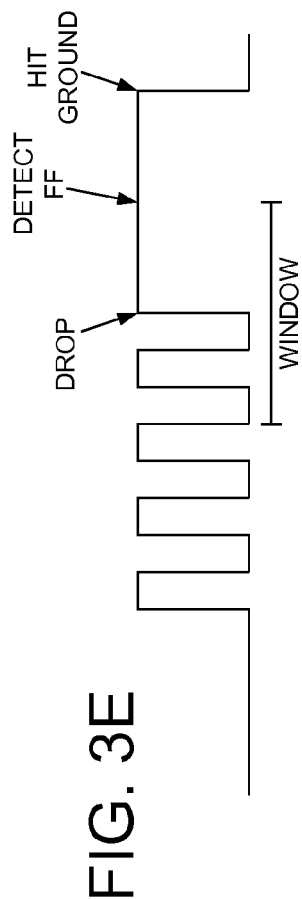
FIGS. 3E and 3F illustrate an embodiment of the present invention wherein the free fall detector is enabled when a magnitude of the frequency response within the frequency band falls below the threshold due to the user dropping the electronic device.
Figure 3F:
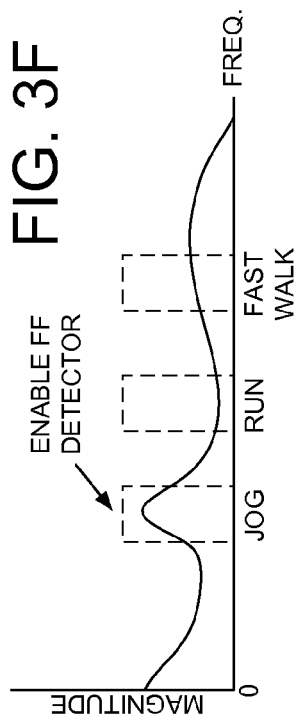

FIGS. 3A-3F illustrate an embodiment of the present invention wherein a window of the acceleration signal is processed to detect whether the magnitude of the frequency response within one of the frequency bands exceeds a threshold. In the example of FIG. 3A, the acceleration signal comprises a square wave representing whether the acceleration signal has exceeded a threshold. A frequency response of the square wave may be generated in any suitable manner, such as by computing a Fourier transform over the window of the acceleration signal. FIG. 3A illustrates a window of the acceleration signal as a user begins jogging, and FIG. 3B shows a corresponding frequency response of the acceleration signal. Since a magnitude of the frequency response does not exceed a threshold within the jog frequency band, a free fall event is initially detected and protective action taken. When the window shifts over a part of the acceleration signal representing the user jogging as shown in FIG. 3C, the magnitude of the frequency response within the jog frequency band exceeds a threshold as shown in FIG. 3D, and therefore the free fall detector is disabled. FIG. 3E illustrates the window shifting over part of the acceleration signal representing the user actually dropping the electronic device with the corresponding frequency response shown in FIG. 3F. Since the magnitude of the frequency response within the jog frequency band falls below the threshold, the free fall detector is enabled so that protective action is taken before the electronic device hits the ground.

In an alternative embodiment, the free fall detector may be enabled in the example of FIG. 3E when a magnitude of the acceleration signal remains above a threshold for a predetermined interval. This embodiment may detect the true free fall event faster as compared to evaluating the frequency response of the acceleration signal. In one embodiment, the predetermined interval for detecting a true free fall event is selected based on a maximum allowable height the electronic device may be safely dropped without damaging components.

Figure 4A:
FIGS. 4A-4D illustrate an embodiment of the present invention wherein a frequency band for disabling the free fall detector is detected by evaluating the frequency response of the acceleration signal relative to a shock detector.
Figure 4B:
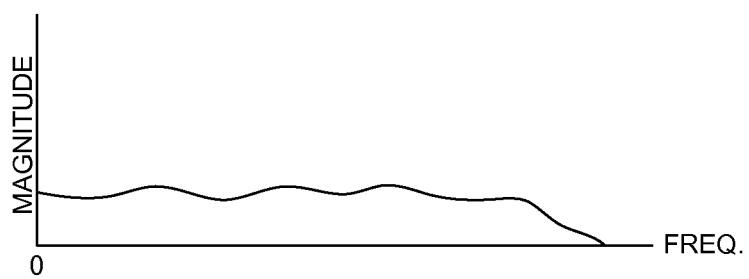
Figure 4C:
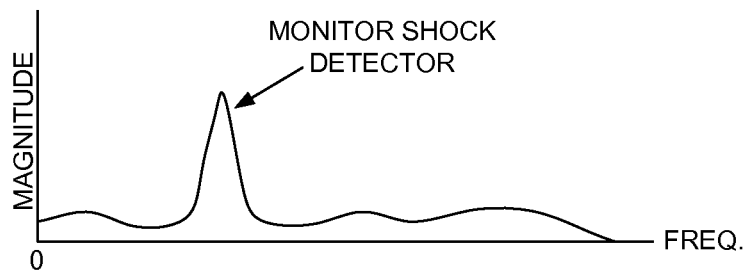
Figure 4D:
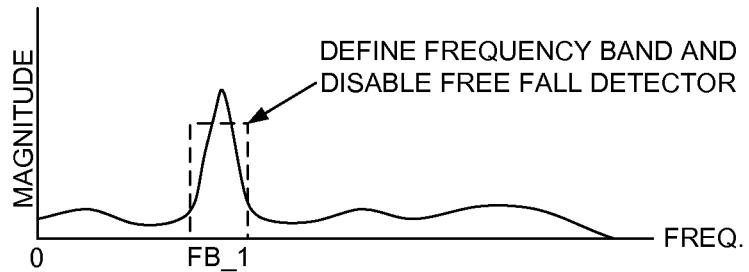

In one embodiment, the control circuitry 8 within the electronic device 2 may adapt or detect a frequency band that corresponds to a normal operating mode of the electronic device. For example, when a new user begins using an electronic device, the frequency band(s) representing the characteristics of the user are unknown. An example embodiment is shown in FIGS. 4A-4D wherein FIG. 4A shows the frequency response of the acceleration signal when the electronic device is stationary. FIG. 4B shows the frequency response as a user begins to jog, and FIG. 4C shows the frequency response after the user has been jogging for the length of the evaluation window described above. When the control circuitry 8 detects that a magnitude of the frequency response has exceeded a threshold, the control circuitry 8 may define a frequency band (FB_1) for disabling the free fall detector as shown in FIG. 4D.

In one embodiment, the electronic device comprises a shock detector operable to detect when the electronic device hits the ground, wherein the control circuitry 8 is further operable to adapt or define a frequency band in response to the shock detector. For example, the control circuitry 8 may not define the frequency band shown in FIG. 4D if the shock signal generated by the shock detector indicates the electronic device has actually been dropped and has hit the ground or other object.

Figure 5A:
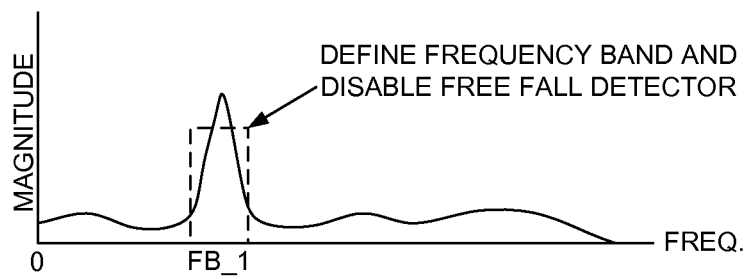
FIGS. 5A-5C illustrate an embodiment of the present invention wherein a frequency band is adjusted when the frequency response of the acceleration signal changes due, for example, to a change in a user's operating habit.
Figure 5B:
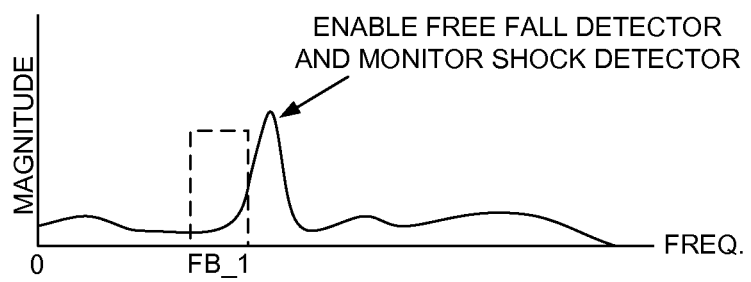
Figure 5C:
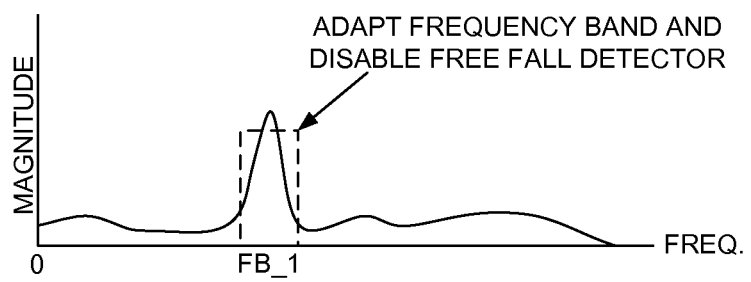

FIGS. 5A-5C illustrate another embodiment of the present invention wherein the control circuitry may adapt an already defined frequency band, for example, when a first user allows a second user to borrow the electronic device. FIG. 5A shows the frequency response of the acceleration signal for a normal operating mode of the first user (e.g., jogging mode), and FIG. 5B shows the frequency response of the acceleration signal for a normal operating mode of the second user (e.g., jogging mode). The control circuitry will initially enable the free fall detector for the second user as shown in FIG. 5B since the magnitude of the frequency response has shifted outside of the frequency band FB_1. The control circuitry may adapt the frequency band FB_1 by shifting the frequency band FB_1 to account for the change in the frequency response. In one embodiment, the control circuitry may adapt a frequency band only if a shock detector does not detect a physical shock to the electronic device as described above.

Any suitable acceleration sensor 4 (FIG. 1A) may be employed in the embodiments of the present invention. In one embodiment, the acceleration sensor may comprise a suitable accelerometer. In another embodiment, the control circuitry may evaluate any suitable signal generated by the electronic device that may be indicative of acceleration (e.g., a fly height signal in a disk drive).

Any suitable control circuitry may be employed in the embodiments of the present invention, such as any suitable integrated circuit or circuits (e.g., an application specific integrated circuit). In one embodiment, the control circuitry comprises a microprocessor operable to execute the steps of a control program stored on any suitable computer readable medium (e.g., a disk or semiconductor memory). In addition, the control circuitry may comprise any suitable circuitry for processing signals in the analog domain and/or in the digital domain (e.g., suitable analog and/or digital circuitry for processing the acceleration signal).

What is claimed is:
1. An electronic device comprising:
an acceleration sensor operable to generate an acceleration signal; and
control circuitry comprising a free fall detector operable to detect a free fall event in response to the acceleration signal, the control circuitry operable to:
measure a frequency response of the acceleration signal; and
disable the free fall detector when a magnitude of the frequency response within one of a plurality of frequency bands exceeds a threshold, wherein each frequency band corresponds to one of a plurality of normal operating modes.
2. The electronic device as recited in claim 1, wherein the free fall detector detects the free fall event when a magnitude of the acceleration signal exceeds a threshold.

3. The electronic device as recited in claim 1, wherein one of the normal operating modes corresponds to a user moving.

4. The electronic device as recited in claim 3, wherein the normal operating modes comprise a user walking fast, a user jogging, and a user running.

5. The electronic device as recited in claim 1, wherein the control circuitry is further operable to enable the free fall detector when the magnitude of the frequency response within the plurality of frequency bands falls below the threshold.

6. The electronic device as recited in claim 1, wherein the control circuitry is further operable to process a window of the acceleration signal to detect whether the magnitude of the frequency response within one of the frequency bands exceeds the threshold.

7. The electronic device as recited in claim 1, wherein the control circuitry is further operable to enable the free fall detector when a magnitude of the acceleration signal remains above a threshold for a predetermined interval.

8. The electronic device as recited in claim 1, wherein the control circuitry is further operable to adapt the plurality of frequency bands based on a history of operation.

9. The electronic device as recited in claim 8, further comprising a shock detector operable to detect when the electronic device hits the ground, wherein the control circuitry is further operable to adapt the plurality of frequency bands in response to the shock detector.

10. An electronic device comprising:
    an acceleration sensor operable to generate an acceleration signal; and
    control circuitry comprising a free fall detector operable to detect a free fall event in response to the acceleration signal, the control circuitry operable to:
        measure a frequency response of the acceleration signal;
        detect a frequency band of the frequency response corresponding to a normal operating mode; and
        disable the free fall detector when a magnitude of the frequency response within the frequency band exceeds a threshold.

11. A method of operating an electronic device, the electronic device comprising an acceleration sensor operable to generate an acceleration signal, and a free fall detector operable to detect a free fall event in response to the acceleration signal, the method comprising:
    measuring a frequency response of the acceleration signal; and
    disabling the free fall detector when a magnitude of the frequency response within one of a plurality of frequency bands exceeds a threshold, wherein each frequency band corresponds to one of a plurality of normal operating modes.

12. The method as recited in claim 11, wherein the free fall detector detects the free fall event when a magnitude of the acceleration signal exceeds a threshold.

13. The method as recited in claim 11, wherein one of the normal operating modes corresponds to a user moving.

14. The method as recited in claim 13, wherein the normal operating modes comprise a user walking fast, a user jogging, and a user running.

15. The electronic device as recited in claim 11, further comprising enabling the free fall detector when the magnitude of the frequency response within the plurality of frequency bands falls below the threshold.

16. The method as recited in claim 11, further comprising processing a window of the acceleration signal to detect whether the magnitude of the frequency response within one of the frequency bands exceeds the threshold.

17. The method as recited in claim 11, further comprising enabling the free fall detector when a magnitude of the acceleration signal remains above a threshold for a predetermined interval.

18. The method as recited in claim 11, further comprising adapting the plurality of frequency bands based on a history of operation.

19. The method as recited in claim 18, wherein the electronic device further comprises a shock detector operable to detect when the electronic device hits the ground, further comprising adapting the plurality of frequency bands in response to the shock detector.

20. A method of operating an electronic device, the electronic device comprising an acceleration sensor operable to generate an acceleration signal, and a free fall detector operable to detect a free fall event in response to the acceleration signal, the method comprising:
    measuring a frequency response of the acceleration signal;
    detecting a frequency band of the frequency response corresponding to a normal operating mode; and
    disabling the free fall detector when a magnitude of the frequency response within the frequency band exceeds a threshold.

* * * * *